(12) United States Patent
Sitaram et al.

(10) Patent No.: US 9,736,811 B1
(45) Date of Patent: Aug. 15, 2017

(54) DETERMINING A CUSTOMIZED PAGING AREA

(71) Applicant: Sprint Spectrum LP, Overland Park, KS (US)

(72) Inventors: Krishna Sitaram, Chantilly, VA (US); Daniel Vivanco, Sterling, VA (US); Saravana Velusamy, Olathe, KS (US)

(73) Assignee: Sprint Spectrum LP, Overland Park, KS (US)

( * ) Notice: Subject to any disclaimer, the term of this patent is extended or adjusted under 35 U.S.C. 154(b) by 166 days.

(21) Appl. No.: 14/191,849

(22) Filed: Feb. 27, 2014

(51) Int. Cl.
*H04W 68/02* (2009.01)
*H04W 8/16* (2009.01)

(52) U.S. Cl.
CPC ............ *H04W 68/02* (2013.01); *H04W 8/16* (2013.01)

(58) Field of Classification Search
CPC ....... H04W 8/16; H04W 88/06; H04W 88/02; H04W 88/08; H04W 92/02; H04W 68/00; H04W 68/02; H04W 68/025; H04W 68/12; H04W 76/02; H04W 52/02; H04W 52/0229; H04W 52/0216; H04W 48/16; H04W 48/20; H04W 4/06; H04W 72/005; H04W 36/18; H04W 36/30; H04W 84/12; H04W 84/18; H04W 80/04; H04B 7/022; H04L 29/06
USPC ...... 455/426.1, 434, 435.1, 435.2, 436, 438, 455/439, 445, 458, 509, 515; 370/328, 370/331, 352, 401
See application file for complete search history.

(56) References Cited

U.S. PATENT DOCUMENTS

| | | | |
|---|---|---|---|
| 6,393,285 B1 * | 5/2002 | Stephens | H04W 60/02 455/405 |
| 7,937,096 B2 | 5/2011 | Funato et al. | |
| 8,271,001 B2 | 9/2012 | Yin et al. | |
| 2003/0050078 A1 * | 3/2003 | Motegi | H04W 60/04 455/456.1 |
| 2007/0232321 A1 | 10/2007 | Casati et al. | |
| 2008/0220782 A1 | 9/2008 | Wang et al. | |
| 2010/0069062 A1 * | 3/2010 | Horn | 455/434 |
| 2010/0069088 A1 | 3/2010 | Fischer | |
| 2011/0096731 A1 | 4/2011 | Kamalaraj et al. | |
| 2011/0201354 A1 * | 8/2011 | Park | 455/456.1 |
| 2012/0252451 A1 | 10/2012 | Knauft et al. | |

* cited by examiner

Primary Examiner — Rafael Pérez-Gutiérrez
Assistant Examiner — Martin Chang

(57) ABSTRACT

A customized paging area is created for a wireless device comprising a first access node and at least one second access node proximate to the first access node. A unique identifier is associated with the determined first access node and the determined at least one second access node of the customized paging area. When the wireless device communicates with a third access node which is not associated with the unique identifier, a second customized paging area is created for the wireless device comprising a third access node and at least one fourth access node proximate to the third access node. A second unique identifier is associated with the determined third access node and the determined at least one fourth access node of the customized paging area.

15 Claims, 6 Drawing Sheets

US 9,736,811 B1

DETERMINING A CUSTOMIZED PAGING AREA

TECHNICAL BACKGROUND

Wireless devices can enter a lower power state, or idle state, when not involved in an active communication session. To notify a wireless device in the idle state of the arrival of data, a call request, and the like for delivery to the wireless device, communication systems can send a paging message to the wireless device. Typically a first paging message is sent first to the last access node with which the wireless device was in communication when it entered the idle state. When the wireless device does not respond to the first paging message, a second paging message can be sent to a group of access nodes, referred to as a tracking area, which includes the last access node with which the wireless device was in communication when it entered the idle state and a predetermined, static group of other access nodes.

Tracking areas are configured manually by the communication network provider. The access nodes comprising the tracking area are assigned a tracking area identifier which is broadcast by each access node. When a mobile wireless device detects a new tracking area identifier, the wireless device sends a tracking area update message to the communication network to indicate its new tracking area. Tracking area dimensioning must be carefully considered by the network operator. When a tracking area is too large, paging operations generate substantial network signaling overhead. When a tracking area is too small, wireless devices send tracking area update messages more frequently, also generating substantial network signaling overhead, as well as negatively affecting power storage and processing of the wireless devices.

OVERVIEW

In operation, an indication is received that a wireless device is in communication with a first access node, and a customized paging area is created for the wireless device. The customized paging area comprises the first access node and at least one second access node proximate to the first access node, for example, selected from a neighbor list of the first access node. A unique identifier is associated with the determined first access node and the determined at least one second access node of the customized paging area. When the wireless device changes to communicating with a third access node which is not associated with the unique identifier, a second customized paging area is created for the wireless device. The second customized paging area can comprise the third access node and at least one fourth access node proximate to the third access node selected, for example, from a neighbor list of the third access node.

DETAILED DESCRIPTION

Figure 1:
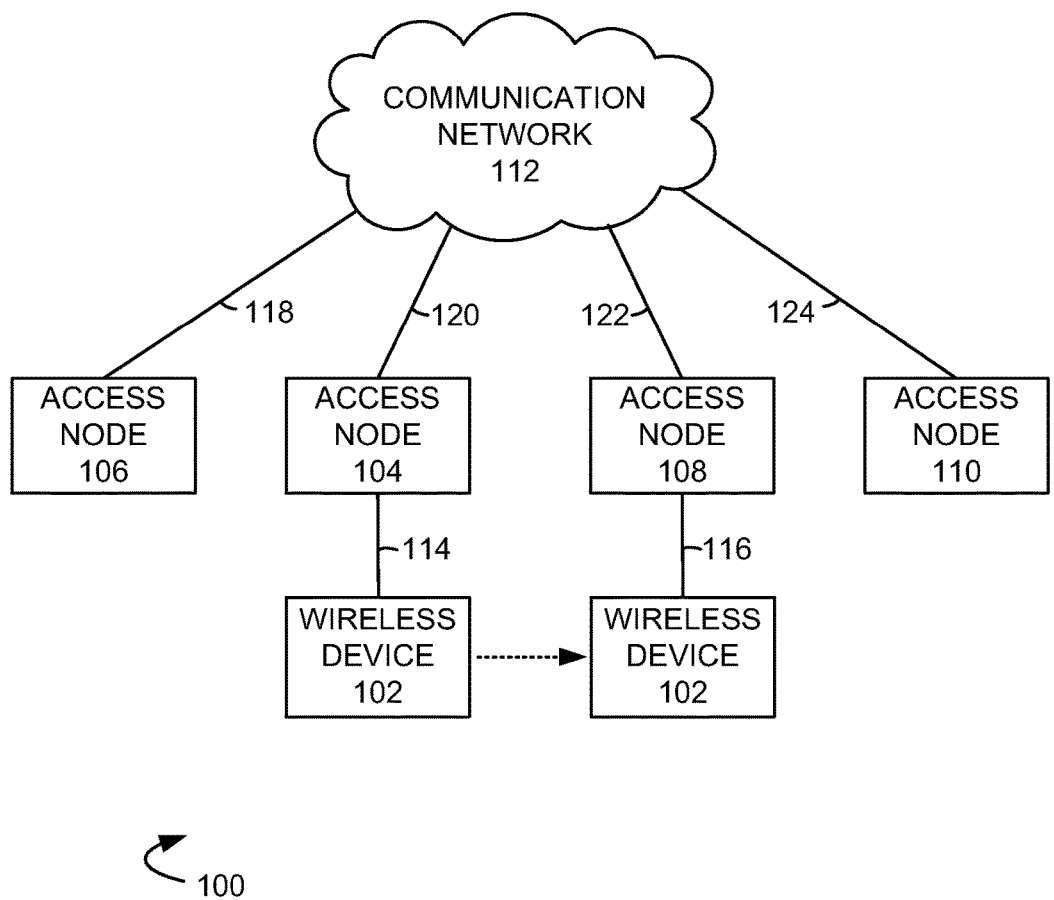
FIG. 1 illustrates an exemplary communication system to determine a paging area customized for a wireless device.

FIG. 1 illustrates an exemplary communication system 100 to determine a paging area customized for a wireless device comprising wireless device 102, access nodes 104, 106, 108, and 110, and communication network 112. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 114, and with access node 108 over communication link 116. Access nodes 104 and 108 can comprise proximate access nodes, and when wireless device 102 is mobile, wireless device 102 can be instructed to change from communicating with access node 104 to communicating with access node 108, for example, through the performance of a handover, cell reselection, and the like.

Access nodes 104, 106, 108, and 110 are each a network node capable of providing wireless communications to wireless device 102, and can comprise, for example, a base transceiver station, a radio base station, an eNodeB device, or an enhanced eNodeB device. Access nodes 104, 106, 108, and 110 are in communication with communication network 112 over communication links 120, 118, 122 and 124, respectively.

Communication network 112 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 112 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 114, 116, 118, 120, 122, and 124 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 104, 106, 108, and 110, and communication network 112 which are omitted for clarity, including additional processing nodes, routers, gateways, and physical and/or wireless data links for carrying data among the various network elements.

Tracking areas are configured manually by the communication network provider. For example, access nodes 104 and 106 can be configured to comprise a first tracking area, and access nodes 108 and 110 can be configured to comprise a second tracking area. Each access node can broadcast information identifying itself, including a tracking area identifier. Typically, when wireless device 102 detects a new tracking area identifier, wireless device 102 sends a tracking area update (TAU) message to the communication network to indicate its new tracking area. Tracking area dimensioning must be carefully considered by the network operator. When a tracking area is too large, paging operations generate substantial network signaling overhead. When a tracking area is too small, wireless devices send tracking area update messages more frequently, also generating substantial network signaling overhead, as well as negatively affecting power storage and processing of the wireless devices.

Network development and/or expansion can further complicate the configuring of tracking areas. For example, smaller access nodes, such as micro nodes, pico nodes, femto nodes, and the like, are rapidly deployable due to their smaller size, and can be used to expand, extend, or fill in the coverage area of a communication network. Manually configuring and reconfiguring tracking areas as additional access nodes are deployed in a service area can slow network development, and improper tracking area configuration can create inefficiencies in network signaling overhead and/or demands on wireless devices.

In operation, when an indication is received that wireless device 102 is in communication with first access node 104, a customized paging area is created for wireless device 102. The customized paging area can comprise access node 104 at least one second access node, such as access node 106. The second access node can be selected from among access nodes proximate to the first access node. For example, the second access node can be selected from a neighbor list of the first access node. A unique identifier is associated with the first access node and the at least one second access node of the customized paging area. When a paging message arrives for wireless device 102 to notify wireless device 102 of data, a call request, and the like pending delivery, a paging message can be send to the access nodes associated with the unique identifier.

Further, wireless device 102 can be mobile, and an indication can be received that wireless device 102 is in communication with third access node 108 which is not associated with the unique identifier. For example, wireless device 102 can perform cell reselection when it enters a coverage area of access node 108. A second customized paging area can be created for wireless device 102 comprising third access node 108 and at least one fourth access node, such as access node 110, which is proximate to the third access node.

Figure 2:
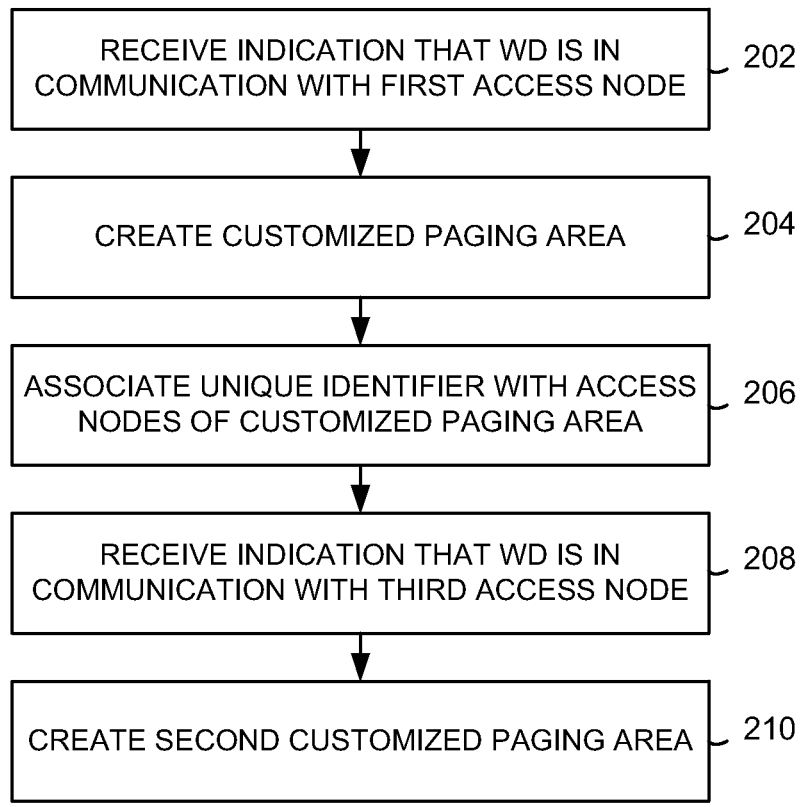
FIG. 2 illustrates an exemplary method of determining a paging area customized for a wireless device.

FIG. 2 illustrates an exemplary method of determining a paging area customized for a wireless device. In operation 202, an indication is received that a wireless device is in communication with a first access node. For example, wireless device 102 can establish a communication session with access node 104. As another example, wireless device 102 can be in a low power state, an idle state, and the like, in which wireless device 102 is not involved in an active communication session, and wireless device 102 can be located in a coverage area of access node 104. Wireless device 102 can provide an indication to the communication network that it is within the coverage area of access node 104.

A customized paging area is created for the wireless device (operation 204). The customized paging area can comprise the first access node and at least one second access node proximate to the first access node selected from a neighbor list of the first access node. For example, access node 104 can be selected for the customized paging area because wireless device 102 is in a coverage area of access node 104. Further, an indication of second access nodes proximate to access node 104 can be used to select at least one second access node for inclusion in the customized paging area. For example, a neighbor list of access node 104, or some other indication of proximate second access nodes, can be used to select at least one second access node (such as access node 106). When the first and second access nodes are selected, a unique identifier can be associated with the determined first access node and the determined at least one second access node of the customized paging area (operation 206). When data is pending delivery to wireless device 102, such as a call request indicating an incoming voice communication request, or data for an application which may be running on wireless device 102, a paging message can be sent to the access nodes associated with the unique identifier (e.g., access nodes 104 and 106).

In addition, wireless device 102 can be mobile, and may move beyond the coverage area of access node 104. When wireless device 102 enters a coverage area of access node 106, wireless device 102 can identify that access node 106 comprises the same unique customized paging area identifier as access node 104, and may not send an message or indication to the communication system that it has selected a new access node (e.g., by cell reselection or a similar process). When wireless device 102 enters a coverage area of access node 108, wireless device 102 can identify that access node 108 is not associated with the unique customized paging area identifier. The communication system may then receive an indication that the wireless device is in communication with a third access node which is not associated with the unique identifier (operation 208). For example, wireless device 102 can perform cell reselection when it enters a coverage area of access node 108.

A second customized paging area can then be created for the wireless device comprising the third access node and at least one fourth access node which is proximate to the third access node (operation 210). For example, access node 108 can be selected for the second customized paging area because wireless device 102 is in a coverage area of access node 108. Further, an indication of fourth access nodes proximate to access node 108 can be used to select at least one second access node for inclusion in the customized paging area. For example, a neighbor list of access node 108, or some other indication of proximate second access nodes, can be used to select at least one second access node (such as access node 110). When the third and fourth access nodes are selected, a second unique identifier can be associated with the determined third access node and the determined at least one fourth access node of the second customized paging area. When data is pending delivery to wireless device 102 after the second customized paging area is created, such as a call request indicating an incoming voice communication request, or data for an application which may be running on wireless device 102, a paging message can be sent to the access nodes associated with the second unique customized paging area identifier (e.g., access nodes 108 and 110).

Figure 3:
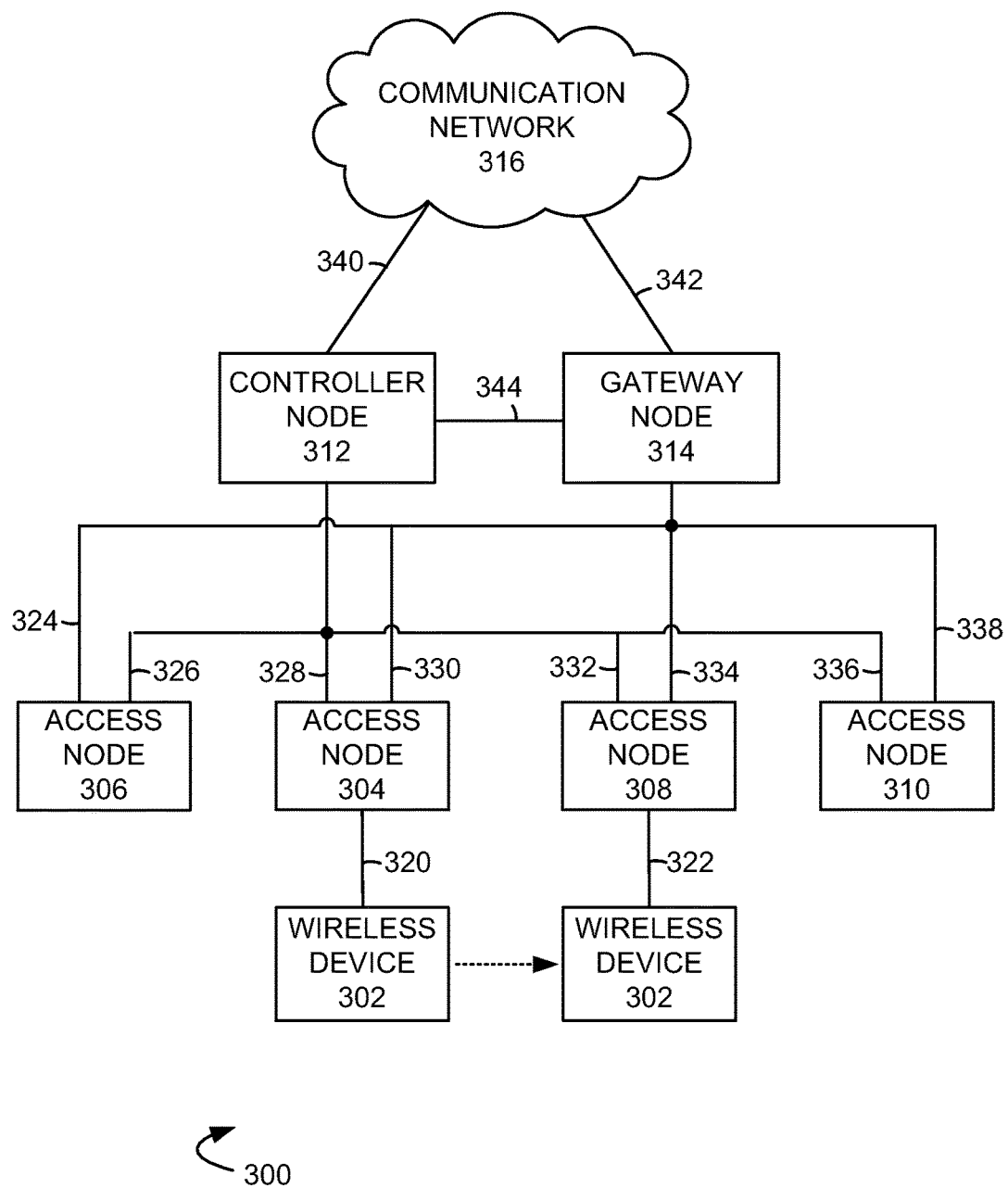
FIG. 3 illustrates another exemplary communication system to determine a paging area customized for a wireless device.

FIG. 3 illustrates another exemplary communication system 300 to determine a paging area customized for a wireless device comprising wireless device 302, access nodes 304, 306, 308, and 310, controller node 312, gateway node 314, and communication network 316. Examples of wireless device 302 can comprise a cell phone, a smart phone, a computing platform such as a laptop, palmtop, or tablet, a personal digital assistant, or an Internet access device, including combinations thereof. Wireless device 302 can communicate with access node 304 over communication link 320, and with access node 308 over communication link 322. Access nodes 304 and 308 can comprise proximate access nodes, and when wireless device 302 is mobile, wireless device 302 can be instructed to change from communicating with access node 304 to communicating with access node 308, for example, through the performance of a handover, cell reselection, and the like.

Access nodes 304, 306, 308, and 310 are each a network node capable of providing wireless communications to wireless device 302, and can comprise, for example, a base transceiver station, a radio base station, an eNodeB device, or an enhanced eNodeB device. Access nodes 304, 306, 308, and 310 are in communication with controller node 312 over communication links 328, 326, 332 and 336, respectively, and with gateway node 314 over communication links 330, 324, 334 and 338, respectively.

Controller node 312 can comprise a processor and associated circuitry to execute or direct the execution of computer-readable instructions, and can be configured to control the setup and maintenance of a communication session over communication network 316 for wireless device 302, as well as to determine a paging area customized for a wireless device. Controller node 312 can comprise a mobile switching center (MSC), a dispatch call controller (DCC), a mobility management entity (MME), or another similar network node. Controller node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 312 can receive instructions and other input at a user interface. Controller node 312 is in communication with communication network 316 over communication link 340, and with gateway node 314 over communication link 344.

Gateway node 314 can comprise a processor and associated circuitry to execute or direct the execution of computer-readable instructions, and can be configured to determine a paging area customized for a wireless device. Gateway node 314 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 314 can receive instructions and other input at a user interface. Examples of gateway node 314 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 308 is in communication with communication network 316 over communication link 342.

Communication network 316 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 316 can be capable of carrying voice information and other data, for example, to support communications by a wireless device such as wireless device 302. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 316 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 316 may also comprise a wireless network, including base stations, wireless communication nodes, telephony switches, internet routers, network gateways, computer systems, communication links, or some other type of communication equipment, and combinations thereof.

Communication links 320, 322, 324, 326, 328, 330, 332, 334, 336, 338, 340, and 342 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304, 306, 308, and 310, controller node 312, gateway node 314, and communication network 316 which are omitted for clarity, including additional processing nodes, routers, gateways, and physical and/or wireless data links for carrying data among the various network elements.

Figure 4:
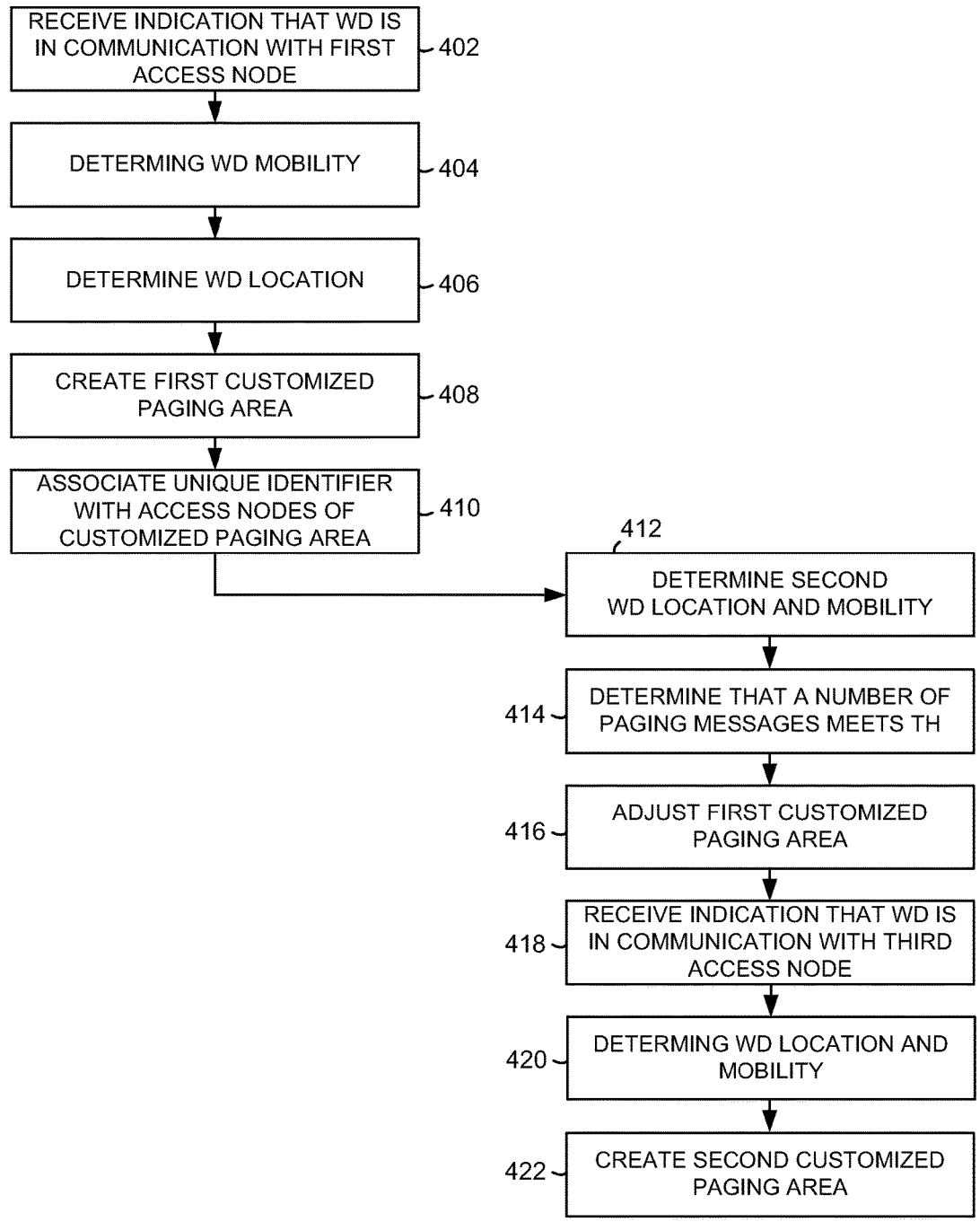
FIG. 4 illustrates another exemplary method of determining a paging area customized for a wireless device.
Figure 5:
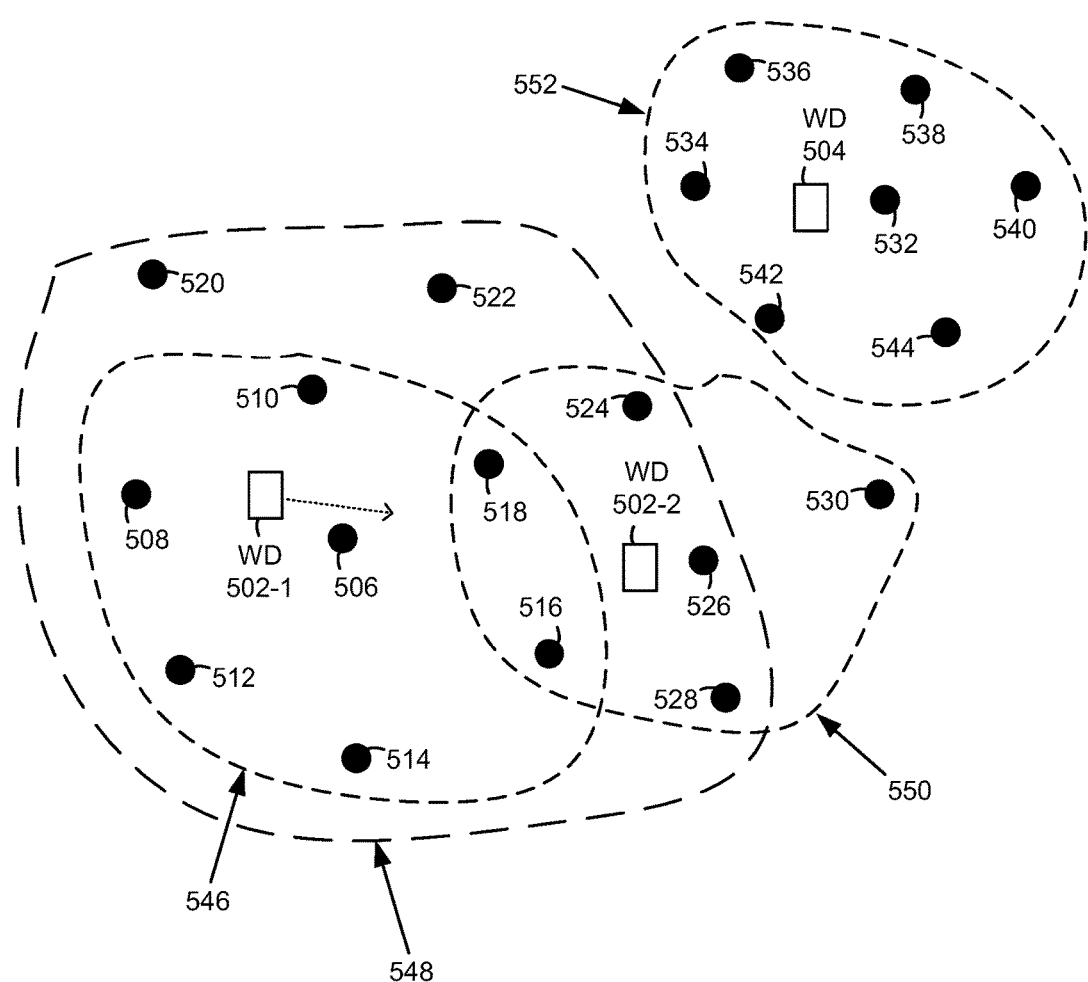
FIG. 5 illustrates another exemplary communication system to determine a paging area customized for a wireless device.

FIG. 4 illustrates another exemplary method of determining a paging area customized for a wireless device. In operation 402, an indication is received that a wireless device is in communication with a first access node. For example, referring to FIG. 5, wireless device 502 can establish a communication session with access node 506. As another example, wireless device 502 can be in a low power state, an idle state, and the like, in which wireless device 502 is not involved in an active communication session, and wireless device 502 can be located in a coverage area of access node 506. Wireless device 502 can provide an indication to the communication network that it is within the coverage area of access node 506.

Returning to FIG. 4, when the indication is received, a mobility of the wireless device is determined (operation 404). For example, a direction and a speed of motion can be determined for wireless device 502 (FIG. 5) over a period of time, such as that indicated by a directional arrow pointing away from wireless device 502 in FIG. 1 (wireless device 502 in a first location is indicated by the reference number 502-1). The mobility of wireless device 502 can indicate motion of the wireless device relative to access node 506. Additionally, or alternatively, a location of the wireless device is determined (operation 406, FIG. 4). The location of the wireless device can be determined, for example, using GPS information from the wireless device, triangulation of signals from two or more access nodes, a geographical location inferred from a network location of the wireless device, and so forth.

A customized paging area is created for the wireless device (operation 408). The customized paging area can comprise the first access node and at least one second access node proximate to the first access node selected from a neighbor list of the first access node. For example, access node 506 (FIG. 5) can be selected for the customized paging area because wireless device 502 is in a coverage area of access node 506. Further, an indication of second access nodes proximate to access node 506 can be used to select at least one second access node for inclusion in the customized paging area. For example, a neighbor list of access node 506, or some other indication of proximate second access nodes, can be used to select at least one second access node (such as access nodes 508, 510, 512, 514, 516, and 518) to create customized paging area 546. When the first and second access nodes are selected, a unique identifier can be associated with the determined first access node and the determined at least one second access node of the customized paging area (operation 410, FIG. 4). When data is pending delivery to wireless device 502, such as a call request indicating an incoming voice communication request, or data for an application which may be running on wireless device 502, a paging message can be sent to the access nodes associated with the unique identifier of customized paging area 546 (e.g., access nodes 506-518).

The customized paging area can be adjusted. For example, referring again to FIG. 4, a second wireless device location and/or mobility can be determined (operation 412). For example, a second location, speed and/or direction of motion can be determined for wireless device 502 as it moves through customized paging area 546. Based on the determined second location, speed and/or direction of wireless device 502, a second number of access nodes proximate to the first access node (e.g., access node 506) can be selected, and the customized paging area can be adjusted based on the first access node and the selected second number of the at least one second access node (operation 416). For example, based on the second location, speed and/or direction of wireless device 502, the customized paging area can be adjusted to include access nodes 520, 522, 524, 526, and 528, within adjusted customized paging area 548.

Additionally, or alternatively, a number of paging messages sent to wireless device 502 can be determined during a period of time after the creation of the customized paging area (operation 414). For example, it can be determined that the number of paging messages sent to the wireless device during the period of time meets a threshold number of paging messages. When the number of paging messages meets the threshold number of paging messages, a second number of the at least one second access node can be selected based on the number of paging messages sent to the wireless devices during the period of time, and the customized paging area for the wireless device comprising the first access node and the selected number of the at least one second access node (e.g., to adjusted customized paging area 548). The number of paging messages sent to the wireless device can provide can indicate a paging overhead or paging load imposed on the communication system when the paging messages are sent to the wireless device, and the number of access nodes in the customized paging area can be increased or decreased based on the network load.

The number of paging messages can also be used in combination with the location, speed, and/or direction of the wireless device in the selection of which access nodes to include in the adjusted customized paging area. For example, access nodes can be selected based on the direction of motion of the wireless device. Further, based on the speed of the wireless device and/or the number of paging messages sent during the time period, a number of access nodes can be selected along the direction of motion of the wireless device. The access node or nodes selected based on the number of paging messages, location, speed, and/or direction of the wireless device can be access nodes which are not proximate to or a neighbor of the first access node. For example, access node 528, included in adjusted customized paging area 548, is not proximate to access node 506, but rather is located on the opposite side of access node 516 from access node 506. The access nodes in adjusted paging area 548 can be associated with the unique identifier used for the access nodes associated with customized paging area 546, or the access nodes in adjusted paging area 548 can be associated with a new unique identifier.

The determination of a number of paging messages can be determined at a second time as well, so that the customized paging area can be adjusted according to an increasing or decreasing number of paging messages sent to the wireless device over time. For example, it can be determined that a second number of paging messages sent to the wireless device during a second period of time meets a second threshold number of paging messages. The selected number of the at least one second access node can be adjusted based on the second number of paging messages sent to the wireless device during the second period of time, and the customized paging area can be adjusted to comprise the first access node and the adjusted selected number of the at least one second access node.

In operation 418, an indication is received that a wireless device is in communication with a third access node. For example, wireless device 502 may move beyond the coverage area of access node 506. A handover can be performed of wireless device 502 to access node 518 (a second access node), which is associated with the same customized paging area identifier as access node 506. As wireless device 502 continues to move, for example, to location 502-2, a second handover can be performed of wireless device 502 to, for example, access node 526 (a third access node). Access node 526 is not associated with customized paging area 546 (or with adjusted customized paging area 548).

When the indication is received, a location, speed, and/or mobility of the wireless device is determined (operation 420). Additionally, or alternatively, a number of paging messages sent to the wireless device can also be determined, for example, based on historical information during a period of time (e.g., when the wireless device was in customized paging area 546 or adjusted customized paging area 548).

A second customized paging area is then created for the wireless device (operation 422). The customized paging area can comprise the third access node (e.g., access node 526) and at least one fourth access node proximate to the first access node (e.g., at least one of access nodes 516, 518, 524, 528 and 530). The fourth access node can be selected from a neighbor list of the third access node. Thus, second customized paging area 550 can be created comprising access node 526 (the third access node) and access nodes 516, 518, 524, 528 and 530 (each a fourth access node).

A second unique identifier can be associated with the determined third access node and the determined at least one fourth access node of second customized paging area 550. Subsequently, when data is pending delivery to wireless device 502, such as a call request indicating an incoming voice communication request, or data for an application which may be running on wireless device 502, a paging message can be sent to the access nodes associated with the unique identifier of customized paging area 550 (e.g., access nodes 516, 518, 524, 526, 528 and 530).

The customized paging area can be created for a single wireless device (e.g., wireless device 502). Further, other customized paging areas can be created for other wireless devices. For example, customized paging area 522 (FIG. 5) can be created for second wireless device 504. Wireless device 504 can establish a communication session with, for example, access node 532. Similarly, wireless device 504 can be in a low power state, an idle state, and the like, in which wireless device 504 is not involved in an active communication session, and wireless device 504 can be located in a coverage area of access node 532. Wireless device 504 can provide an indication to the communication network that it is within the coverage area of access node 532. When the indication is received, a direction, speed, and/or location of wireless device 504 can be determined, and a customized paging area (e.g., customized paging area 552) can be created for wireless device 504. Customized paging area 552 can be created for wireless device 504 without reference to wireless device 502. In addition, customized paging area 552 can be adjusted independent of another customized paging area based on a second direction, speed, location, and/or a number of paging messages sent to wireless device 504 during a period of time.

Figure 6:
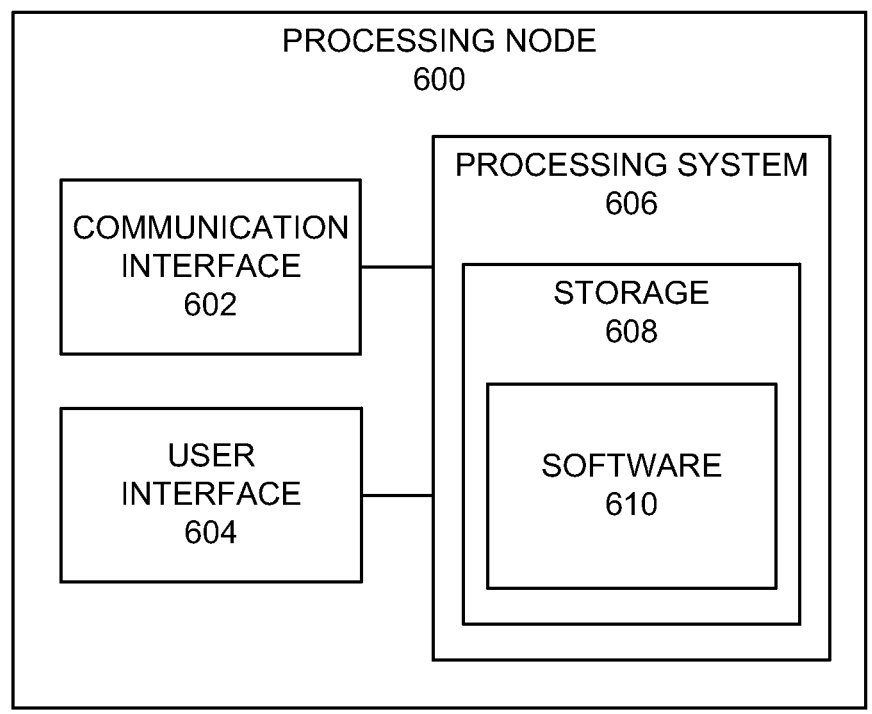
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a paging area customized for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104, 106, 108, and 110, access nodes 304, 306, 308, and 310, controller node 312, and gateway 314. Processing node 600 can also be an adjunct or component of a network element, such as an element of access nodes 104-110, access nodes 304-310, controller node 312, or gateway 314. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of determining a paging area customized for a wireless device, comprising:
   receiving an indication that a wireless device is in communication with a first access node;
   creating for the wireless device a customized paging area comprising the first access node and at least one second access node proximate to the first access node selected from a neighbor list of the first access node;
   associating a unique identifier with the determined first access node and the determined at least one second access node of the customized paging area;
   determining that the customized paging area for the wireless device should be adjusted based on at least one of a number of paging messages sent to the wireless device during a period of time and a mobility for the wireless device;
   selecting a number of the at least one second access nodes proximate to the first access node such that the selected number of second access nodes varies directly with the number of paging messages sent to the wireless device during the period of time;
   selecting at least one third access node proximate to the at least one second access node based on at least one of the number of paging messages sent to the wireless device and the mobility for the wireless device, wherein the at least one third access node is not proximate to the first access node;
   creating for the wireless device the adjusted customized paging area comprising the first access node, the selected number of the at least one second access nodes, and the at least the one third access node;
   receiving an indication that the wireless device is in communication with a fourth access node which is not associated with the unique identifier; and
   creating for the wireless device a second customized paging area comprising the fourth access node and at least one fifth access node proximate to the fourth access node selected from a neighbor list of the fourth access node.

2. The method of claim 1, further comprising associating a second unique identifier with the determined fourth access node and the determined at least one fifth access node of the second customized paging area.

3. The method of claim 1, further comprising:
   determining a mobility of the wireless device when the indication is received;
   selecting a number of second access nodes proximate to the first access node based on the number of paging messages sent to the wireless device during the period of time and the mobility of the wireless device; and
   creating for the wireless device the customized paging area comprising the first access node and the selected number of second access nodes.

4. The method of claim 1, further comprising:
   determining a location of the wireless device relative to the first access node when the indication is received;
   selecting a number of the at least one second access node proximate to the first access node based on the number of paging messages sent to the wireless device during the period of time and the location of the wireless device relative to the first access node; and
   creating for the wireless device the customized paging area comprising the first access node and the selected number of the at least one second access node.

5. The method of claim 4, further comprising:
   determining a second location of the wireless device at a second time after the indication is received that the wireless device is in communication with the first access node;
   selecting a second number of the at least one second access node proximate to the first access node based on the second location of the wireless device relative to the first access node; and
   adjusting the customized paging area for the wireless device based on the first access node and the selected second number of the at least one second access node.

6. The method of claim 5, further comprising:
   determining a second mobility of the wireless device at the second time;
   adjusting the selected number of second access nodes proximate to the first access node based on the second mobility of the wireless device during a second period of time; and
   selecting the second number of the at least one second access node proximate to the first access node based on the second location of the wireless device relative to the first access node and the second mobility.

7. The method of claim 1, further comprising:
   determining that a second number of paging messages sent to the wireless device during a second period of time meets a second threshold number of paging messages;
   adjusting the selected number of the at least one second access nodes based on the second number of paging messages sent to the wireless device during the second period of time; and
   creating for the wireless device another adjusted customized paging area comprising the first access node, the adjusted selected number of the at least one second access nodes, and the at least the one third access node.

8. The method of claim 1, wherein the first access node and the at least one second access node are associated with a first customized paging area identifier and the fourth access node and the at least one fifth access node are associated with a second customized paging area identifier.

9. A system for determining a paging area customized for a wireless device, comprising:
   a processing node configured to:
      receive an indication that a wireless device is in communication with a first access node;
      create for the wireless device a customized paging area comprising the first access node and at least one second access node proximate to the first access node selected from a neighbor list of the first access node;
      associate a unique identifier with the determined first access node and the determined at least one second access node of the customized paging area;
      determine that the customized paging area for the wireless device should be adjusted based on at least one of a number of paging messages sent to the wireless device during a period of time and a mobility for the wireless device;
      select a number of the at least one second access nodes proximate to the first access node such that the selected number of second access nodes varies directly with the number of paging messages sent to the wireless device during the period of time;
      select at least one third access node proximate to the at least one second access node based on at least one of the number of paging messages sent to the wireless device and the mobility for the wireless device, wherein the at least one third access node is not proximate to the first access node;

create for the wireless device the adjusted customized paging area comprising the first access node, the selected number of the at least one second access nodes, and the at least the one third access node;

receive an indication that the wireless device is in communication with a fourth access node which is not associated with the unique identifier; and create for the wireless device a second customized paging area comprising the fourth access node and at least one fifth access node proximate to the fourth access node selected from a neighbor list of the fourth access node.

10. The system of claim 9, wherein the processing node is further configured to associate a second unique identifier with the determined fourth access node and the determined at least one fifth access node of the second customized paging area.

11. The system of claim 9, wherein the processing node is further configured to:

determine a mobility of the wireless device when the indication is received;

select a number of second access nodes proximate to the first access node based on the number of paging messages sent to the wireless device during the period of time and the mobility of the wireless device; and create for the wireless device the customized paging area comprising the first access node and the selected number of second access nodes.

12. The system of claim 9, wherein the processing node is further configured to:

determine a location of the wireless device relative to the first access node when the indication is received;

select a number of the at least one second access node proximate to the first access node based on the number of paging messages sent to the wireless device during the period of time and the location of the wireless device relative to the first access node; and create for the wireless device the customized paging area comprising the first access node and the selected number of the at least one second access node.

13. The system of claim 12, wherein the processing node is further configured to:

determine a second location of the wireless device at a second time after the indication is received that the wireless device is in communication with the first access node;

select a second number of the at least one second access node proximate to the first access node based on the second location of the wireless device relative to the first access node; and adjust the customized paging area for the wireless device based on the first access node and the selected second number of the at least one second access node.

14. The system of claim 13, wherein the processing node is further configured to:

determine a second mobility of the wireless device at the second time;

adjust the selected number of second access nodes proximate to the first access node based on the second mobility of the wireless device during a second period of time; and select the second number of the at least one second access node proximate to the first access node based on the second location of the wireless device relative to the first access node and the second mobility.

15. The system of claim 9, wherein the processing node is further configured to:

determine that a second number of paging messages sent to the wireless device during a second period of time meets a second threshold number of paging messages;

adjust the selected number of the at least one second access nodes based on the second number of paging messages sent to the wireless device during the second period of time; and create for the wireless device another adjusted customized paging area comprising the first access node, the adjusted selected number of the at least one second access nodes, and the at least the one third access node.

* * * * *